United States Patent [19]
Hodnett

[11] 4,081,608
[45] Mar. 28, 1978

[54] ARRANGEMENT FOR REMOTE CONTROL APPARATUS

[75] Inventor: Irving E. Hodnett, Lynchburg, Va.

[73] Assignee: General Electric Company, Lynchburg, Va.

[21] Appl. No.: 751,896

[22] Filed: Dec. 17, 1976

[51] Int. Cl.[2] ........ H04M 11/00
[52] U.S. Cl. ........ 179/2 A; 179/2 EA; 179/1 SW
[58] Field of Search ........ 179/2 R, 2 A, 2 AM, 179/2 E, 41 A, 84 VF, 90 K, 1 VC, 1 SW

[56] References Cited

U.S. PATENT DOCUMENTS

| | | | |
|---|---|---|---|
| 2,583,032 | 1/1952 | Waterman | 179/41 A |
| 3,383,467 | 5/1968 | New | 179/2 A |

*Primary Examiner*—Kathleen H. Claffy
*Assistant Examiner*—Joseph A. Popek
*Attorney, Agent, or Firm*—James J. Williams

[57] ABSTRACT

Signals are transmitted over a line from a control location to a remote location in order to control an apparatus at the remote location. Frequently, the line is subjected to faults, such as voltages, noise, or opens. Or there may be a power failure at the remote location. Such faults or failures will probably be unknown to the user at the control location. An arrangement is provided at the control location for automatically and periodically transmitting the last selected control signal to insure that the apparatus at the remote location is operated as desired by the user.

10 Claims, 3 Drawing Figures

ARRANGEMENT FOR REMOTE CONTROL APPARATUS

BACKGROUND OF THE INVENTION

My invention relates to an arrangement for controlling remote apparatus, and particularly to such an arrangement at a control location that repeats commands at periodic intervals.

Remote control apparatus is used extensively at a control location to control apparatus at a remote location. One application for remote control is a radio transmitter and receiver which are placed at a remote location, such as on a mountain top which provides a good antenna site. For efficiency and convenience, the user of the transmitter and receiver is located in an office or home. Such an application requires that the user be connected by a communication line, such as a telephone line, to the remote transmitter and receiver. As known in the art, control of the remote transmitter and receiver is achieved by sending signals from the user or control location to the remote location. Such signals may take various forms, such as voltage pulses or tones. Previously, these signals were transmitted once to provide the control function. Thereafter, the user performed his duties with the assumption that the remote apparatus was performing as initially commanded by the control signals. However, if the communication line was subjected to unknown faults, such as a voltage surge, an open, or extraneous noise, or if there was an unknown power failure, the remote apparatus might thereafter be operating improperly or not operating at all. Hence, the user might erroneously assume that his remote aparatus was operating as originally commanded.

Accordingly, a primary object of my invention is to provide a new and improved arrangement for remote control apparatus.

Another object of my invention is to provide a new and improved arrangement that periodically repeats the initial command signal selected by a user at a control location for controlling apparatus at a remote location.

Another and more specific object of my invention is to provide a new and improved arrangement for remote control apparatus that assures a user that his original command signal will be repeatedly transmitted to the remote apparatus so that if an unknown fault occurs in the connecting line or at one of the locations, the proper command signal will be transmitted to correct any error which may have occurred because of the fault.

SUMMARY OF THE INVENTION

Briefly, these and other objects are achieved in accordance with my invention by control apparatus having a signal generator that produces a control signal for transmission from a user location to a remote location. The signal generator is enabled by a user operating a switch. An initial operate circuit causes the enabled signal generator to send an initial control signal to the remote location to set up the apparatus to provide the desired function. A pulser is connected to the signal generator for operating the signal generator, when enabled, at periodic intervals after the initial signal so that the control signal is transmitted at those subsequent intervals to assure the user that the desired control signal is transmitted. If another function is desired, the user operates another switch which causes the signal generator to transmit a different signal initially and at periodic intervals thereafter.

BRIEF DESCRIPTION OF THE DRAWING

The subject matter which I regard as my invention is particularly pointed and distinctly claimed in the claims. The structure and operation of my invention, together with further objects and advantages, may be better understood from the following description given in connection with the accompanying drawing, in which:

DESCRIPTION OF A PREFERRED EMBODIMENT

Figure 1:
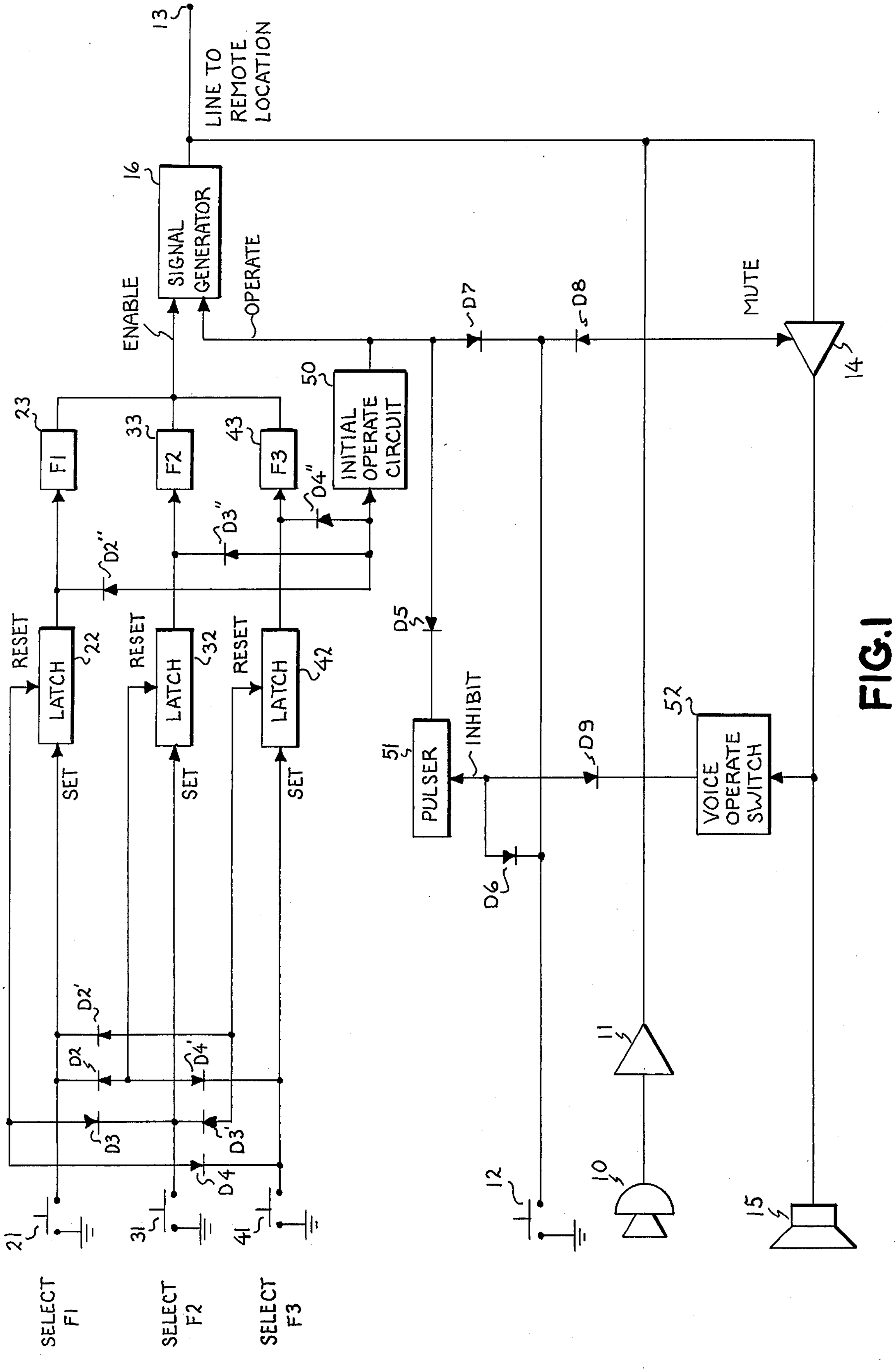
FIG. 1 shows a block diagram of a preferred embodiment of my invention.

As an example of a use for my improved arrangement for remote control apparatus, I have assumed that the apparatus shown in FIG. 1 is used at a control station to control the operation of a remote radio transmitter and receiver. However, it is to be understood that my arrangement can be used to control other types of equipment as well. At the control station, a microphone 10 is connected through an amplifier 11 to a terminal 13 for connection to a communication line (typically a telephone line) connected to the radio transmitter at the remote location. As is typical, the microphone 10 includes a push-to-talk-button 12 which is depressed by a user or operator to render the microphone operative. The output terminal 13 is also connected to a receiver amplifier 14 to amplify audio signals received from the line and supply them to a loudspeaker 15. As will be explained, the amplifier 15 has a mute input which, when supplied with a low or zero signal, turns the amplifier 14 off.

Because the transmitter and receiver are remotely located with respect to the user at the control location, control apparatus is desirable or necessary. Such control apparatus can cause the remote apparatus to perform any type of function desired. As an example, I have assumed that it is desired to control the frequency of transmission and reception of the remote equipment, and have shown three push buttons 21, 31, 41 for respectively switching the remote equipment to a frequency F1, F2, or F3 respectively. Each of the push buttons 21, 31, 41 is preferably of the type kept open by a spring, but which is closed when depressed. Each of the buttons 21, 31, 41 is respectively connected between ground or a reference potential and the set input of a latch circuit 22, 32, 42. When a push putton is depressed, it supplies a zero or low voltage to the set input that causes the respective latch circuit to take a set condition. When set, each latch circuit connects its respective one of the frequency determining elements 23, 33, 43 to the enable input of a signal generator 16, which I have assumed to be an audio tone oscillator. The frequency determining elements 23, 33, 43 may be any suitable circuit device such as a resistor, a capacitor, or a crystal. When one of the elements 23, 33, 43 is operatively connected by a latch circuit being set, it enables the signal generator 16 to produce a tone frequency determined by the characteristic of the connected one of the elements 23, 33, 43. I have shown a single signal generator 16 with several selectable frequency determining elements, but it should be understood that three separate and complete signal generators can be utilized. In such a case, a latch circuit being set would enable a respective one signal generator. Each of the push buttons 21, 31, 41 is also connected through isolating diodes to the reset inputs of the latch circuits associated with the other push buttons. The push button 21 is connected through diodes D2, D2′ to the reset inputs of the latch circuits 32, 42; the push button 31 is connected through diodes D3, D3′ to the reset inputs of the latch circuits 22, 42; and the push button 41 is connected through the diodes D4, D4′ to the reset inputs of the latch circuits 22, 32. When any push button is operated, it sets its respective latch circuit and resets the other two latch circuits. Thus, only one of the latch circuits 22, 32, 42 can be set at any one time, so that the signal generator 16 can be enabled with only one frequency determining element at any one time.

The signal generator 16 also includes an operate input. When this input is provided with a low or zero voltage, the signal generator 16, when previously enabled, produces a tone determined by the characteristic of the frequency determining element. This operate signal is provided by a low or zero voltage from an initial operate circuit 50 which may be a one shot multivibrator. The input of the circuit 50 is connected through isolating diodes D2″, D3″, D4″ to the outputs of the latch circuits 22, 32, 42 so that when a latch circuit is set, the initial operate circuit 50 produces a short duration low or zero voltage pulse. A typical duration would be in the order of 100 milliseconds, which is sufficient time to operate the enabled signal generator 16 and cause it to produce the tone for that duration. This tone is connected to the terminal 13 for transmission over the line to produce the desired function at the remote transmitter and receiver.

With the circuit as described thus far, an operator can select a particular operating radio frequency, such as F1, for the remote transmitter and receiver. Since this radio frequency F1 is selected by the push button 21, the operator momentarily depresses the push button 21 to set the latch circuit 22 and reset the latch circuits 32, 42. With the latch circuit 22 set, the F1 frequency determining element 23 is operatively connected to the signal generator 16, so that the generator is enabled. When the latch circuit 22 became set, it also operated the initial operate circuit 50 which, in turn, supplied an operate signal to the signal generator 16 to cause the enabled signal generator 16 to supply the audio tone frequency corresponding to the operating frequency F1 desired by the operator. This audio tone frequency is utilized at the remote location to cause the transmitter and receiver to be energized, if not already in that condition, and to switch to the desired radio frequency F1.

While this arrangement is satisfactory, persons skilled in the art will appreciate that a communication line extending over any distance is susceptible to various faults. For example, the line may receive voltages either from a lightning strike or through inductive coupling, or may become open, or be subjected to some other electrical interference. Or, there may be a power failure. Whatever may happen, it is possible that the remote equipment receives a false or no control signal, with the result that a user or operator does not know whether his remote equipment is in the condition desired. The only way an operator can correct this is to repeatedly operate the desired one of his push buttons 21, 31, 41. Such repeated operation is undesirable, since it subjects the opertor to one more problem or duty. And, there are times when the operator may not have the time or may not recall the need for repeatedly operating the proper push button. Accordingly, I have provided an arrangement which eliminates the necessity of the operator worrying or concerning himself with this problem. In accordance with my invention, I provide a pulser circuit 51 which (unless blocked or inhibited by a signal at its inhibit input) produces a low or zero voltage output at periodic intervals, for example for 5 seconds out of every 60 seconds. The pulser 51 may take a number of forms, such as an astable or free-running miltivibrator. The output of the pulser 51 is connected through an isolating diode D5 to the operate input of the signal generator 16. Thus, as the pulser 51 operates, it supplies an operate signal to the generator 16 so that the generator 16, when previously enabled, produces the signal during the periodic output of the pulser 51. Thus, a user or operator at the control location is assured that his remote equipment is being supplied with the necessary control signal.

In addition to this improvement, I have added several other features which can be necessary or desirable. I connect the microphone push-to-talk-button 12 through an isolating diode D6 to the inhibit input of the pulser 51. This inhibits the pulser 51 when the button 12 is depressed. The button 12 is also connected through an isolating diode D7 to the operate input of the generator 16. Thus, when the push button 12 is operated (indicating that audio signals are being or can be transmitted), it causes the signal generator 16 to be operated and also inhibits or blocks the pulser 51. The push button 12 is also connected through an isolating diode D8 to the mute input of the receive amplifier 14 so that when the button 12 is depressed, the amplifier 14 is turned off or blocked. Thus, signals picked up by the microphone 10 and amplified by the amplifier 11 are not fed back to the loudspeaker 15 but are transmitted only to the line and the remote location.

One other feature which I find desirable is the use of a voice operated switch 52 which is connected to the output of the receive amplifier 14 and which produces a low or zero voltage in response to audio signals produced by the amplifier 14. This low voltage signal from the switch 52 is connected through an isolating diode D9 to the inhibit input of the pulser 51 so that the pulser 51 is blocked when voice signals are being received. Thus, no tones are supplied to the line when signals are received.

Figure 2:
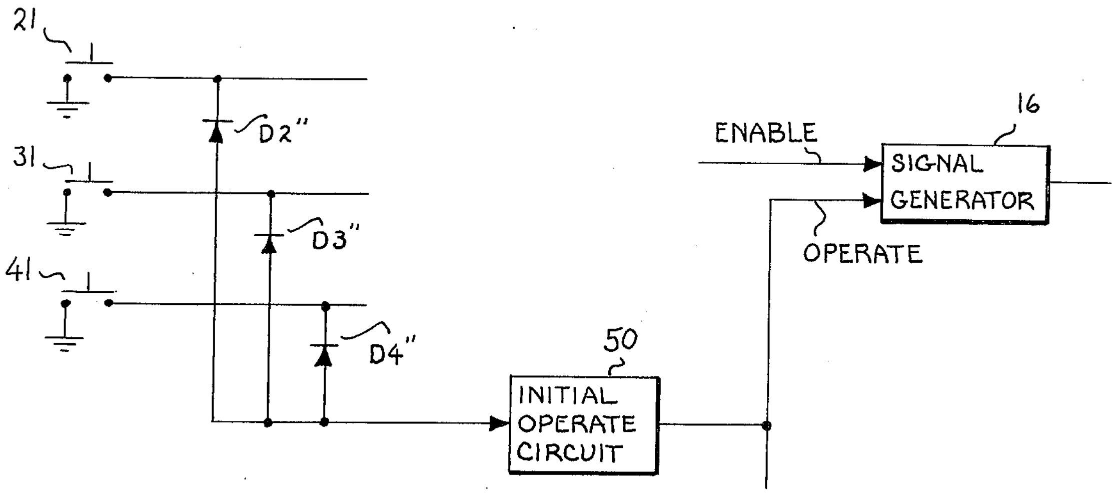
FIGS. 2 and 3 show modifications of the embodiment of FIG. 1.
Figure 3:
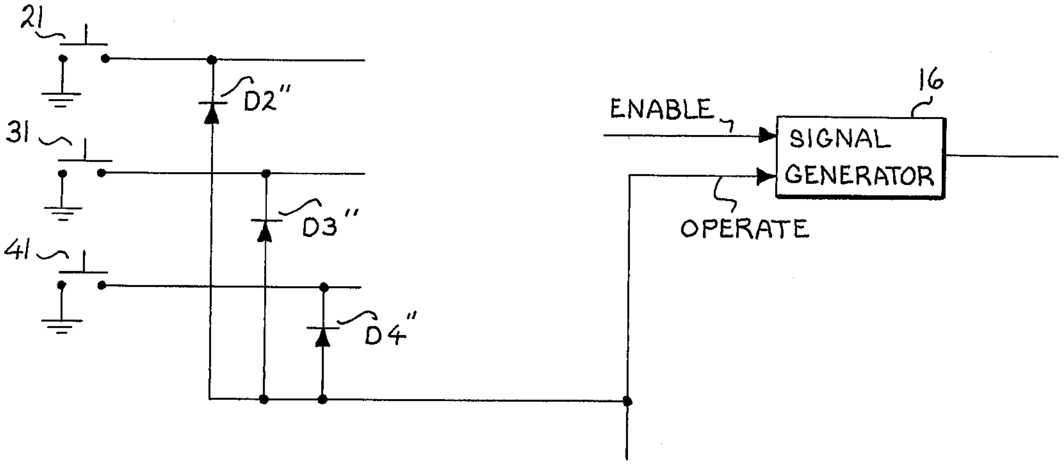

It will thus be seen that I have provided a new and improved arrangement which provides assurance to a control station operator that his remote equipment will be repeatedly provided with a control signal so as to eliminate any false operations which might result from the line being subjected to an undesired electrical signal. While the embodiment shown in the figure illustrates operation with only three push buttons, persons skilled in the art will appreciate that any number of push buttons and related circuits can be provided so that the signal generator 16 can supply any number of desired control signals to achieve any desired function or operation. And I have already mentioned that the signal generator 16 may, instead of having selectable frequency determining elements, comprise separate and distinct generators. The generator 16 can be used to supply other types of control signals, such as a burst of digital pulses, or a voltage of selected magnitude and polarity, or some other type of control signal. As shown in FIG. 2, the initial operate circuit 50 may have its input connected through the diodes D2″, D3″, D4″ to each of the push buttons 21, 31, 41 (instead of to the latch circuits 22, 32, 42) so as to be operated directly by the push buttons instead of by the latch circuits 22, 32, 42. As shown in FIG. 3, the initial operate circuit 50 can be omitted and a direct connection can be made from the push buttons 21, 31, 41 through the diodes D2″, D3″, D4″ to the operate input of the generator 16 so than an output signal is produced by the enabled generator 16 when a push button is depressed. And the times of the pulser circuit 51 and the initial operate circuit 50 may be varied to meet various operating conditions. Therefore, while my invention has been described with reference to a particular embodiment, it is to be understood that modifications may be made without departing from the spirit of the invention or from the scope of the claims.

What I claim as new and desire to secure by Letters Patent of the U. S. is:

1. An improved arrangement for use at a first location for controlling an apparatus at a second location comprising:

a. first means for producing a control signal for transmission to said apparatus at said second location;

b. second means connected to said first means for placing said first means in an enabled condition in response to said second means being operated;

c. third means connected between said second and first means for causing said first means, when enabled, to produce said control signal in response to said second means being operated;

d. a pulser for producing repetitive pulses;

e. and fourth means connecting said pulser to said first means for causing said first means, when enabled, to produce said control signal in response to each of said pulses.

2. The arrangement of claim 1 wherein said third means produces a signal of predetermined time duration in response to said second means being operated, and wherein said first means produces said control signal in response to and for the time duration of said predetermined time signal.

3. The arrangement of claim 1 wherein said third means produces an operate signal having a time duration determined by said second means, and wherein said first means produces said control signal in response to and for the time duration of said operate signal.

4. The arrangement of claim 1 and further comprising output terminals for connection to a transmission line extending between said first location and said second location, means connecting said output terminals to the output of said first means, and means between said output terminals and said pulser for preventing said pulser from supplying said pulses in response to audio signals present on said transmission line.

5. The arrangement of claim 1 and further comprising means for sensing that audio signals can be transmitted from said first location to said second location, and means connected between said sensing means and said first means for causing said first means, when enabled, to produce said control signal in response to said sensing that audio signals can be transmitted.

6. The arrangement of claim 1 and further comprising output terminals for connection to a transmission line extending between said first location and said second location, means connecting said output terminals to the output of said first means, means connected between said output terminals and said pulser for preventing said pulser from supplying said pulses in response to audio signals present on said transmission line, means for sensing that audio signals can be transmitted from said first location to said second location, and means connected between said sensing means and said first means for causing said first means, when enabled, to produce said control signal in response to said sensing that audio signals can be transmitted from said first location to said second location.

7. An improved arrangement for use at a first location for controlling an apparatus at a second location comprising:

a. means for producing control signals for transmission to said apparatus at said second location;

b. a plurality of first means connected to said control signal producing means, each of said first means placing said control signal producing means in an enabled condition in response to said first means being operated;

c. second means connected between each of said first means and said control signal producing means for causing said control signal producing means, when enabled, to produce said control signal in response to said first means being operated;

d. a pulser for producing repetitive pules;

e. and third means connecting said pulser to said control signal producing means for causing said control signal producing means, when enabled, to produce said control signal in response to each of said pulses.

8. The arrangement of claim 7 and further comprising means connected between said plurality of first means for permitting only one of said first means to place said control signal producing means in said enabled condition at a time.

9. The arrangement of claim 8 wherein said second means cause said control signal producing means to produce said control signal for a predetermined time duration in response to each operation of said first means.

10. The arrangement of claim 8 wherein said second means cause said control signal producing means to produce said control signal for a time duration determined by said first means.

* * * * *

UNITED STATES PATENT OFFICE

CERTIFICATE OF CORRECTION

Patent No. 4,081,608 Dated March 28, 1978

Inventor(s) Irving E. Hodnett

It is certified that error appears in the above-identified patent and that said Letters Patent are hereby corrected as shown below:

Column 2, line 35, cancel "15" and insert -- 14 --

Column 6, line 36, cancel "pules" and insert -- pulses --

Signed and Sealed this

*Third* Day of *October 1978*

[SEAL]

*Attest:*

RUTH C. MASON
*Attesting Officer*

DONALD W. BANNER
*Commissioner of Patents and Trademarks*